United States Patent [19]

Peterson

[11] Patent Number: 5,022,804
[45] Date of Patent: Jun. 11, 1991

[54] SELF-MOUNTING FASTENER

[75] Inventor: Francis C. Peterson, Woodbury, Conn.

[73] Assignee: Buell Industries, Inc., Waterbury, Conn.

[21] Appl. No.: 310,392

[22] Filed: Feb. 14, 1989

[51] Int. Cl.[5] ............................................. F16B 37/04
[52] U.S. Cl. .................................... 411/104; 403/331; 403/406.1; 411/112; 411/113; 411/173; 411/183
[58] Field of Search .................. 411/103, 104, 84, 85, 411/111–113, 173, 177, 183; 403/331, 406.1

[56] References Cited

U.S. PATENT DOCUMENTS

| 2,404,372 | 7/1946 | Hallock | 411/113 |
| 2,409,209 | 10/1946 | Johnson | 411/111 |
| 2,867,258 | 1/1959 | Flora et al. | 411/113 |
| 3,695,324 | 10/1972 | Gulistan . | |
| 4,352,521 | 10/1982 | Trenkler | 411/103 X |
| 4,428,705 | 1/1984 | Gelhard | 411/103 X |
| 4,662,808 | 5/1987 | Camilleri | 411/340 |

FOREIGN PATENT DOCUMENTS

| 1153572 | 8/1963 | Fed. Rep. of Germany | 411/103 |
| 1286814 | 1/1969 | Fed. Rep. of Germany | 411/112 |
| 1941232 | 2/1970 | Fed. Rep. of Germany | 411/177 |
| 1107934 | 8/1955 | France | 411/113 |
| 743651 | 1/1956 | United Kingdom | 411/113 |

Primary Examiner—Lloyd A. Gall
Attorney, Agent, or Firm—St. Onge Steward Johnston & Reens

[57] ABSTRACT

A self-mounting fastener adapted to mount to an aperture in a workpiece, comprising a fastener body having a base and a connecting stem; and a cage formed of a sleeve sized to slidably receive the base, having an opening in at least one side thereof, and having a fixed latch and at least one hinged latch operable and adapted to engage the aperture by the sliding of the base in the sleeve.

16 Claims, 2 Drawing Sheets

SELF-MOUNTING FASTENER

FIELD OF THE INVENTION

The present invention relates to a self-mounting fastener useful to locate a nut on a structure without welding.

BACKGROUND OF THE INVENTION

Caged fasteners such as caged nuts are frequently used in the manufacture of automobiles and other goods. A caged nut generally comprises a nut engaged in a structure that allows access to the nut bore, and provides the nut with a limited range of movement within the cage. In the manufacture of automobiles using caged nuts, the cage is welded onto the frame of the automobile and provides a nut at a selected location for the attachment of another part, such as a door, to the frame. The range of movement of the nut in the cage is provided so that the part being mounted on the frame may be adjusted relative to the frame during final assembly.

A caged nut provides advantages in that it can be assembled into a product framework during manufacture, so that the number of operations required in the final assembly of the product are reduced. If a caged nut was not provided in such situations, it would often be difficult to locate a nut by hand to receive a bolt used to fasten components such as a door onto a vehicle frame. In the usual practice in the automotive industry, the caged nut is spot welded on the frame prior to the application of rust inhibiting coatings and paint.

It has been found that welding the caged nut onto the frame can promote corrosion of the frame, since rust inhibiting coatings applied after welding may not penetrate into the space between the cage and the frame, thereby leaving bare metal parts which are susceptible to corrosion.

However, it is generally not good practice to weld to a coated or painted workpiece, since the coating will impede effective welding, and the welding will damage and disrupt any protective coatings applied to the workpiece. Accordingly, it has heretofore been necessary to mount the caged nut to the frame before painting.

In addition, the practice of welding a caged nut to the frame before painting often leads to the problem of paint clogged threads where a female threaded fastener is required. This causes problems in the subsequent mounting of a part to the fastener, since a screw will not easily fit into a paint clogged fastener.

Accordingly, the present invention provides a self-mounting fastener which is adapted to mount in an aperture in a framework or workpiece without welding, and which may be mounted after the application of coatings and paint to the workpiece.

SUMMARY OF THE INVENTION

It is an object of the present invention to provide a self-mounting fastener adapted to mount on an aperture in a workpiece without welding. It is a further object of the invention to provide such a self-mounting fastener which may be mounted without special tools, and which may be performed manually or by suitable adapted machines. It is a further object of the invention to provide the advantages of a caged nut, without the problems inherent in a caged nut, which must be welded to the workpiece prior to the applications of coatings and paint.

In accordance with the invention, a self-mounting fastener adapted to mount to an aperture in a workpiece, comprises a fastener body; and a cage formed of a sleeve sized to slidably receive the body, having an opening in at least one side thereof, and having at least one hinged latch means operable and adapted to engage the aperture by the sliding of the body in the sleeve. The fastener body preferably comprises a substantially flat and rectangular base and a stem extending therefrom. The hinged latch means is located adjacent the opening and extends laterally outwardly from the sleeve, and is preferably a bracket having a generally U-shaped cross-section integrally formed from the cage. Fixed latch means adapted to engage the aperture are also provided. The fixed latch means is located adjacent the opening and extends laterally outwardly from the sleeve, in the same direction as the hinged latch means, and is preferably a bracket having a generally U-shaped cross-section integrally formed from the cage. The sleeve preferably comprises a channel having an open slot along its length, and an open end for receiving the fastener base and a stop end for limiting movement of the fastener. The fastener stem extends through the open slot of the channel sleeve.

The hinged latch means is preferably movable about a hinge from a first position wherein the hinged latch means extends into the opening towards the fixed latch means and away from the fastener receiving end of the cage, to a second mounting position wherein the hinged latch means is substantially parallel to the fixed latch means, the hinged latch means being movable from the first position to the second mounting position by the sliding movement of the base in the sleeve, whereby the fastener may be mounted on the workpiece by locating the sleeve adjacent the aperture with the fixed latch means engaging the aperture, and sliding the base in the sleeve to pivot the hinged latch means from its first position to its second mounting position to engage the aperture and mount the fastener to the workpiece.

Means for resisting separation of the fastener and cage are preferably provided, and preferably comprises a notch located in the base, and at least one finger extending from the sleeve sized to fit into the notch and resist separation of the fastener and the cage. Preferably the edge of the rectangular base closest the hinged latch means is cut away, whereby the base has an upper extending portion adapted to push on the hinged latch means.

Other objects, aspects and features of the present invention in addition to those mentioned above will be pointed out in detail or will be understood from the following detailed description provided in conjunction with the accompanying drawings.

DETAILED DESCRIPTION OF THE DRAWINGS

Figure 1:
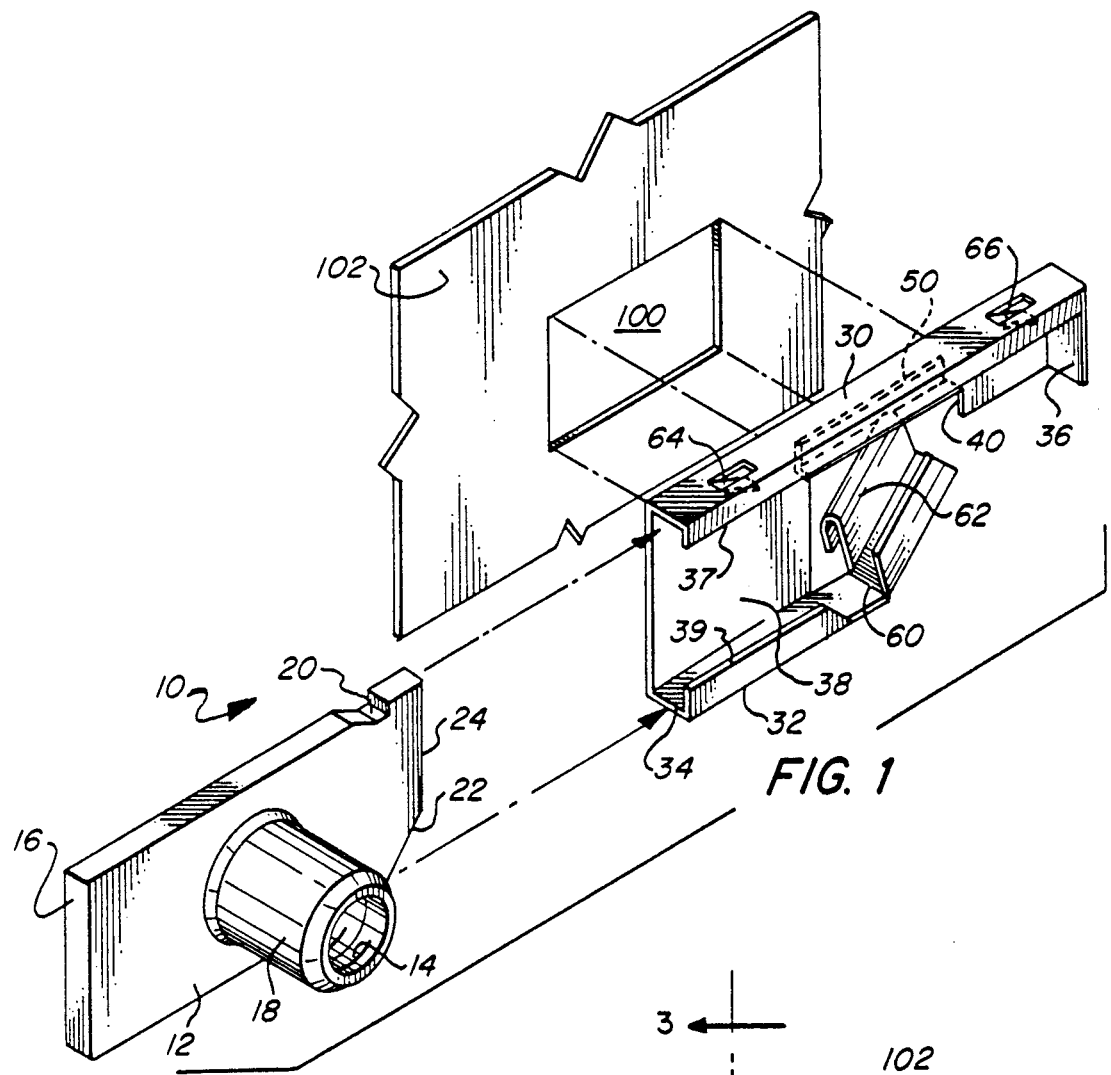
FIG. 1 is an exploded perspective view of a self-mounting fastener of the present invention and an apertured workpiece onto which the fastener may be mounted.

With reference to FIGS. 1-5, a self-mounting fastener adapted to be mounted in an aperture 100 in a workpiece 102 is shown generally at 10. Fastener 10 comprises a fastener body 12 having connecting means. The connecting means may comprise a female fastening means such as a connecting bore adapted to receive a male fastener, such as a rivet, male threaded fastener, or a male snap-in connector, or it may comprise a male fastening means such as a threaded stud or bolt, or a snap mount connector. In the preferred embodiment, the connecting means comprises a bore 14 which is internally threaded to receive a male threaded fastener. Fastener body 12 preferably has a substantially planar and rectangular base 16. Threaded bore 14 preferably extends through a cylindrical stem 18 extending from base 16. At least one notch 20 is preferably provided in one edge of the base 16. One edge 22 is preferably cut away such that base 16 comprises a generally pentagonal shape having a leading edge 24. However, it is to be appreciated that many alternative shapes of the fastener and base may be adapted to use in the present invention in accordance with the principles of the invention.

Fastener 10 further comprises a cage 30. Cage 30 comprises a channel sleeve 32 sized to slidably receive the base 16. Sleeve 32 has a fastener receiving end 34 and a stop end 36. Stop end 36 may be enclosed, or cut away as shown in FIG. 1. Sleeve 32 has a slot 38 along one side thereof defined by the edges 37 or 39 of sleeve 32 through which extends the stem 18 of fastener body 12. An opening 40 is located in the side o the sleeve 32 opposite the slot 38.

Fixed latch means adapted to engage the workpiece aperture 100 extend laterally outwardly from the sleeve 32 adjacent the opening 40. The fixed latch means preferably comprise a bracket 50 generally U-shaped cross-section which is integrally formed with the sleeve 32.

Figure 2:
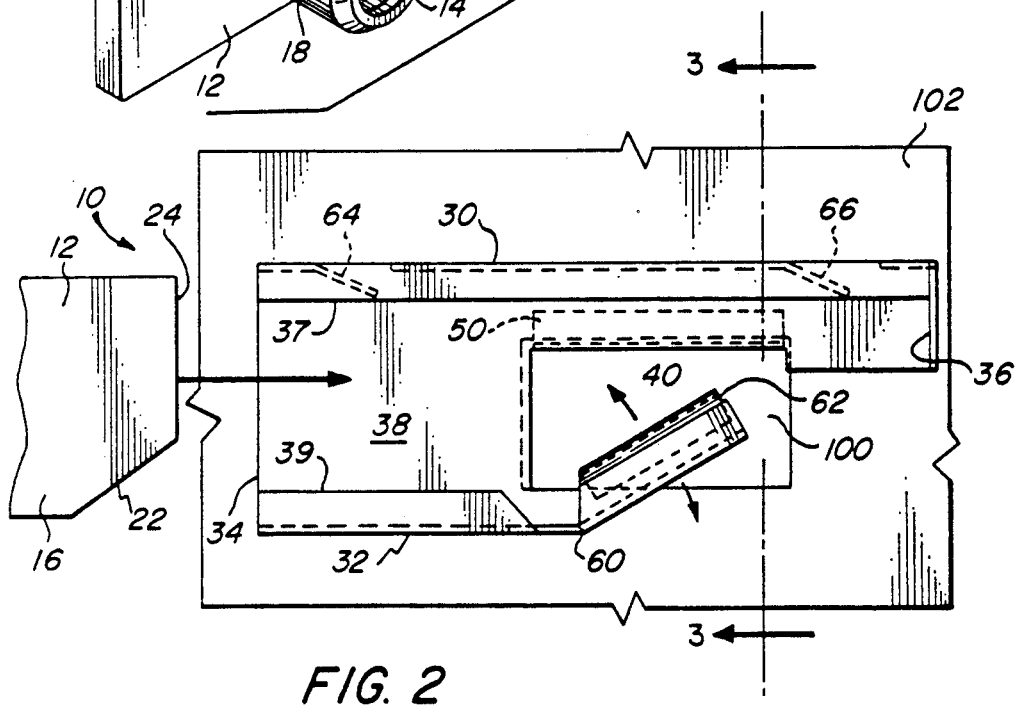
FIG. 2 is an elevation view of a sleeve of a self-mounting fastener located on an aperture in a workpiece prior to securing the self-mounting fastener to the workpiece.
Figure 3:
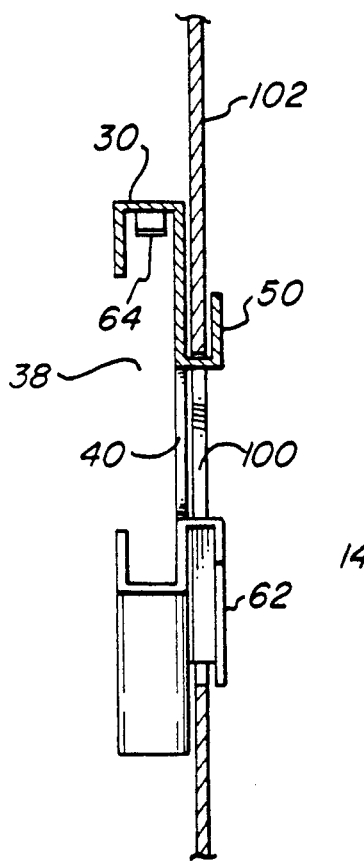
FIG. 3 is cross-sectional view along the line 3—3 of FIG. 2.
Figure 5:
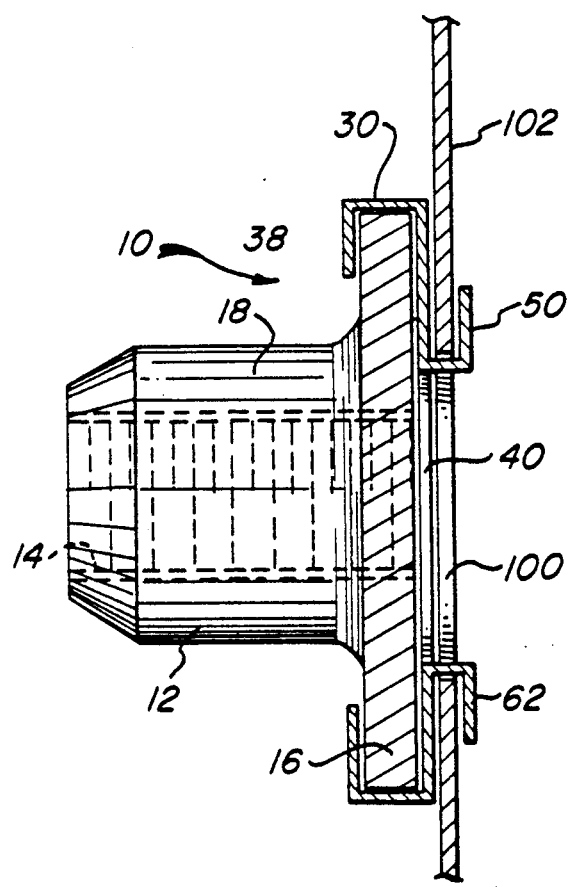
FIG. 5 is a cross-sectional view along the line 5—5 of FIG. 4.
Figure 4:
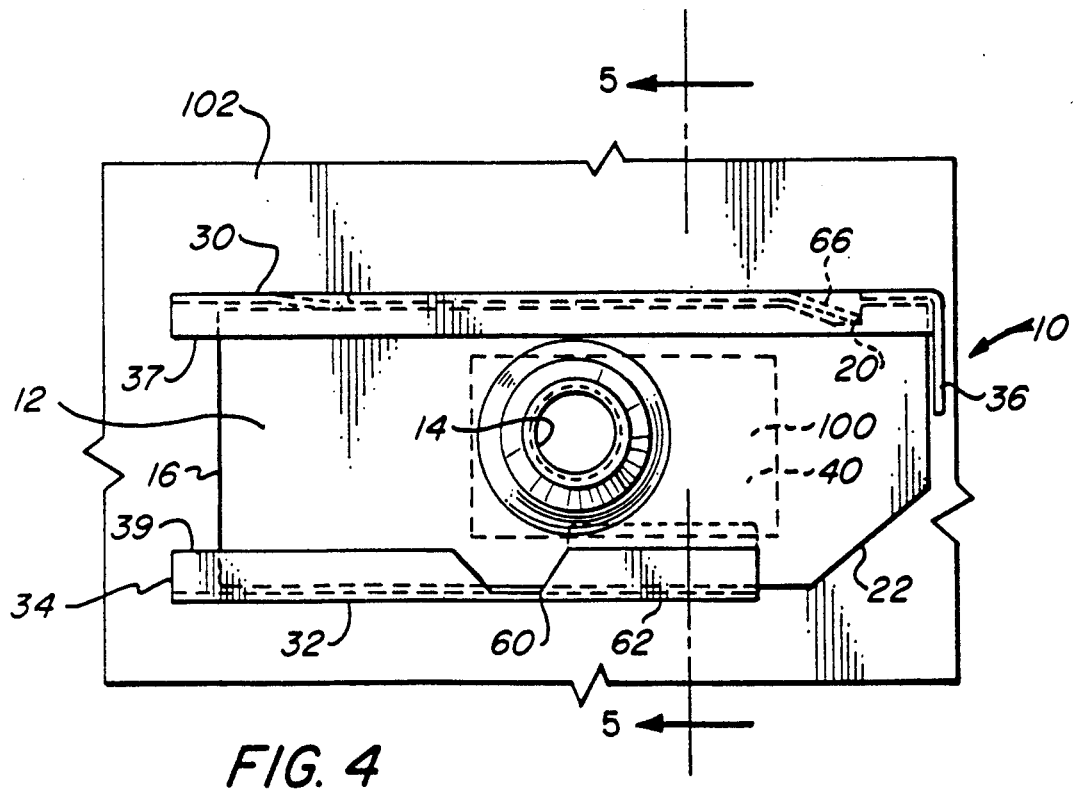
FIG. 4 is an elevation view showing a self-mounting fastener mounted to an aperture in a workpiece.

Hinged latch means adapted to engage the workpiece aperture 100 similarly extend laterally outwardly from the sleeve 32 adjacent the opening 40. The hinged latch means are movable about a hinge 60 from a first position wherein the hinged latch means extends into opening 40 towards the fixed latch means and away from fastener receiving end 34 of cage 30 as shown in FIGS. 1-3, to a second mounting position wherein the hinged latch means is substantially parallel to the fixed latch means, as shown in FIGS. 4 and 5. The hinged latch means is pivoted from the first position to the second mounting position by the pressure of extending portion 24 of the base 16 on the hinged latch means caused by sliding movement of the base 16 in the sleeve 32. Preferably the hinged latch means comprises a bracket 62 having a generally U-shaped cross-section integrally formed with the sleeve 32. The hinge 60 may be formed by cutting away portions of the sleeve to provide a flexible strip of material connecting the bracket 62 to the sleeve 32.

Means for resisting separation of the fastener body 12 and cage 30 are provided so that they may be preassembled together and provided to an assembly line for use in assembling, inter alia, automobiles, without loss of time and effort to assemble the individual components thereof. The separation resisting means preferably comprises notch 20 located in base 16, and at least one finger, extending from sleeve 32, sized to fit into notch 20 and resist separation of the fastener body 12 and cage 30. Preferably the fingers are flexibly connected to sleeve 32 and extend towards stop end 36 thereof. Preferably, there are two such fingers, one finger 64 being located nearer fastener receiving end 34 of sleeve 32, and one finger 66 being located nearer stop end 36 of sleeve 32. Finger 64 serves to retain fastener body 12 in cage 30 prior to mounting self-mounting fastener 10 to aperture 100. Finger 66 locks fastener body 12 in place in cage 30 after mounting of self-mounting fastener 10 to aperture 100 to reduce the likelihood of inadvertent dismounting from aperture 100. The particular arrangement and location of the fingers and notch may be varied as desired, and may be located on either or both of the edges and sides of self-mounting fastener 10.

Fastener body 12 and cage 30 are preferably formed of stainless steel. The fastener body 12 may be manufactured by cold forging techniques such as are known in the art. The cage 30 may be formed from sheet stock, and punched and folded by metal forming techniques as are known in the art.

Self-mounting of the fastener of the present invention is obtained by placing the cage 30 and fastener body 12 adjacent aperture 100 with the fixed latch means 50 and hinged latch 62 means located in the aperture and positioned to engage the edges of the aperture, as shown in FIGS. 2 and 3. The fastener body 12 is moved sideways by sliding until the leading edge 24 of base 16 presses on the hinged latch means, prior to the sliding of the rest of the base 16 over the hinge 60, causing it to move downwardly to fit around the edge of aperture 100, such that the self-mounting fastener 10 is mounted to the edges of aperture 100 by the fixed latch means 50 and the hinged latch means 62, as shown in FIGS. 4 and 5.

Parts may then be mounted to the workpiece by a screw directed from the opposite side of the workpiece from the self-mounting fastener 10 through the part, the aperture 100, the opening 40, and into the threaded bore 14.

It is to be appreciated that variations and adaptions within the scope of the invention to obtain a self-mounting fastener 10 may be made, and may include variations in the shapes of the fastener and base and the sleeve. Instead of locating the fixed and hinged latch means on opposite sides of the opening 40, they may be located on adjacent sides. The fixed latch means may be omitted and a second hinged latch means used in its place. If desired, two hinged latch means may be provided on opposite sides of the opening 40 and a fixed latch means may be provided on a third side of the opening 40. In yet a different adaption, the sleeve may comprise a tube-like structure adapted to be mounted with the sleeve extending laterally outwardly from the workpiece and aperture, in which at least one hinged latch means is adapted to move to engage the aperture by the sliding motion of a fastener in the sleeve towards the aperture rather than across it.

The preferred embodiment described, as well as other adaptions within the scope of the invention, provide a self-mounting fastener adapted to mount on an aperture in a workpiece without welding, and permits the mounting of a fastener after paint and other coatings have been applied without damaging the painted and coated workpiece.

I claim:

1. A self-mounting fastener adapted to mount to an aperture in a workpiece, said workpiece having a plane, said aperture being located in said workpiece plane and extending perpendicularly thereto, comprising:
   a fastener body; and
   a cage formed of a sleeve in which said fastener body is slidably fitted, having at least one hinged latch means operable and adapted to engage said aperture by the sliding of said body in said sleeve in a direction substantially parallel to the plane of said workpiece.

2. A self-mounting fastener in accordance with claim 1, wherein said sleeve has an opening in at least one side thereof, and wherein said hinged latch means is located adjacent said opening and extends laterally outwardly from said sleeve.

3. A self-mounting fastener in accordance with claim 2, wherein said hinged latch means comprises a bracket having a generally U-shaped cross-section integrally formed from said cage.

4. A self-mounting fastener in accordance with claim 2, further comprising fixed latch means adapted to engage said aperture.

5. A self-mounting fastener in accordance with claim 4, wherein said fixed latch means is located adjacent said opening and extends laterally outwardly from said sleeve.

6. A self-mounting fastener in accordance with claim 5, wherein said fixed latch means comprises a bracket having a generally U-shaped cross-section integrally formed from said cage.

7. A self-mounting fastener in accordance with claim 2, wherein said sleeve comprises a channel having two ends wherein at least a first of said ends is pen for receiving said fastener body and a second of said ends comprises stop means for limiting movement of said fastener body.

8. A self-mounting fastener in accordance with claim 1, further comprising means for resisting separation of said fastener body and said cage.

9. A self-mounting fastener in accordance with claim 8, wherein said separation resisting means comprises a notch located in said body, and at least one finger extending from said sleeve sized to fit into said notch and resist separation of said fastener body and said cage.

10. A self-mounting fastener in accordance with claim 1, wherein said fastener body comprises a base and a fastener stem, and wherein the edge of said base closest said hinged latch means is cut away, whereby said base has an upper extending portion adapted to push on said hinged latch means.

11. A self-mounting fastener adapted to mount to an aperture in a workpiece, said workpiece having a plane, said aperture being located in said workpiece plane and extending perpendicularly thereto, comprising:

(a) a female threaded fastener body having a base and an internally threaded stem extending therefrom; and
   (b) a cage formed of a channel sleeve in which said bas is slidably fitted, having a fastener receiving end and a stop end, said sleeve having a slot along one side thereof through which extends said stem and an opening in the side opposite said slot, and
      (i) fixed latch means adapted to engage said workpiece aperture extending laterally outwardly from said sleeve adjacent said opening, and
      (ii) hinged latch means adapted to engage said workpiece aperture extending laterally outwardly from said sleeve adjacent said opening, said hinged latch means being movable about a hinge from a first position wherein said hinged latch means extends into said opening towards said fixed latch means and away from said fastener receiving end of said cage, to a second mounting position wherein said hinge latch means is substantially parallel to said fixed latch means, said hinged latch means being movable from said first position to said second mounting position by sliding movement of said base in said sleeve in a direction substantially parallel to the plane of said workpiece,
   whereby said fastener may be mounted on said workpiece by locating said sleeve adjacent said aperture with said fixed and hinged latch means inserted in said aperture, and sliding said base in a direction substantially parallel to the plane of said workpiece from said fastener receiving end to said stop end in said sleeve to pivot said hinged latch means from its first position to its second mounting position to engage the edge of said aperture and mount said fastener to the workpiece.

12. A self-mounting fastener in accordance with claim 11, wherein the edge of said base closest said hinged latch means is cut away, whereby said base has an upper extending portion adapted to push on said hinged latch means prior to the sliding of said base over said hinge.

13. A self-mounting fastener in accordance with claim 11, further comprising means for resisting separation of said fastener body and said cage.

14. A self-mounting fastener in accordance with claim 13, further comprising a notch located in said base, and at least one finger extending from said sleeve sized to fit into said notch and resist separation of said fastener body and said cage.

15. A self-mounting fastener in accordance with claim 11, wherein said fixed latch means comprises a bracket having a generally U-shaped cross-section integrally formed from said cage.

16. A self-mounting fastener in accordance with claim 11, wherein said hinged latch means comprises a bracket having a generally U-shaped cross-section integrally formed from said cage.

* * * * *